(12) United States Patent
Nirasawa

(10) Patent No.: US 8,059,499 B2
(45) Date of Patent: Nov. 15, 2011

(54) DRIVE SIGNAL GENERATING APPARATUS AND DRAWING APPARATUS

(75) Inventor: Haruhiko Nirasawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 483 days.

(21) Appl. No.: 12/382,053

(22) Filed: Mar. 6, 2009

(65) Prior Publication Data

US 2009/0231966 A1 Sep. 17, 2009

(30) Foreign Application Priority Data

Mar. 17, 2008 (JP) ................................. 2008-067311

(51) Int. Cl.
*G11B 7/00* (2006.01)
(52) U.S. Cl. .................. 369/30.12; 369/44.28
(58) Field of Classification Search ............... 369/44.28, 369/44.29, 30.1, 30.12–30.14, 44.34; 347/224, 347/247, 262, 167
See application file for complete search history.

(56) References Cited

U.S. PATENT DOCUMENTS

| | | | |
|---|---|---|---|
| 6,226,240 B1 * | 5/2001 | Aoki ........................ | 369/44.28 |
| 7,177,246 B2 | 2/2007 | Hanks et al. | |
| 2003/0202432 A1 * | 10/2003 | Joung ....................... | 369/30.16 |
| 2004/0189236 A1 * | 9/2004 | Chan et al. .................. | 318/685 |
| 2005/0058030 A1 | 3/2005 | Hanks et al. | |
| 2005/0265145 A1 * | 12/2005 | Nakane et al. ............. | 369/44.28 |
| 2006/0193237 A1 | 8/2006 | Morishima et al. | |
| 2006/0256677 A1 * | 11/2006 | Bahng ......................... | 369/47.1 |
| 2007/0014208 A1 * | 1/2007 | Auh .......................... | 369/44.28 |
| 2007/0230304 A1 * | 10/2007 | Nakane et al. ............. | 369/44.29 |

FOREIGN PATENT DOCUMENTS

| | | |
|---|---|---|
| JP | 2003-187471 | 7/2003 |
| JP | 2003-203348 | 7/2003 |
| JP | 2006-512718 | 4/2006 |
| WO | WO 2005034106 A2 | 4/2005 |
| WO | WO 2005034106 A3 | 4/2005 |

* cited by examiner

*Primary Examiner* — Thang Tran
(74) *Attorney, Agent, or Firm* — McGinn IP Law Group, PLLC

(57) ABSTRACT

Provided is a drive signal generating apparatus including: an arithmetic section that calculates an approximate expression to approximate variations of multiple detected values each representing one of a position of an optical pickup section and an amount of positional deviation of the optical pickup section with respect to a current target position, the position of the optical pickup section being sequentially detected when the optical pickup section moves stepwise toward multiple target positions set in advance on a drawing surface of a drawing target; and a drive signal generation section that generates a second drive signal synchronized with a first drive signal for causing the optical pickup section to move stepwise, the second drive signal having a signal value corresponding to an approximate value calculated by substituting a value associated with each of the multiple target positions into the approximate expression so as to move an optical component provided in the optical pickup section.

11 Claims, 12 Drawing Sheets

DETECTED VALUE TABLE

| POSITION NUMBER | DIFFERENCE VALUE |
|---|---|
| 1 | +xx1 |
| 2 | +xx2 |
| 3 | −xx3 |
| 4 | −xx4 |
| 5 | +xx5 |
| ⋮ | ⋮ |
| n | −zzzz |
| ⋮ | ⋮ |

DETECTED VALUE TABLE

| POSITION NUMBER | CALCULATED VALUE |
|---|---|
| 1 | xx1 |
| 2 | xx2 |
| 3 | xx3 |
| 4 | xx4 |
| 5 | xx5 |
| ⋮ | ⋮ |
| n | zzzz |
| ⋮ | ⋮ |

Fig. 11

DRIVE SIGNAL GENERATING APPARATUS AND DRAWING APPARATUS

BACKGROUND

1. Field of the Invention

The present invention relates to a drive signal generating apparatus and a drawing apparatus.

2. Description of Related Art

In recent years, along with the popularization of information recording media such as an optical disk, drawing apparatuses that draw an image on the drawing surface of an optical disk have been widely used.

Various specific methods are available to draw an image on an optical disk. For example, there is a method of ejecting ink onto the label surface of an optical disk to draw an image thereon. Additionally, there is a method of applying a laser beam onto the label surface of an optical disk to draw an image thereon. In the latter case, a thermosensitive layer formed on the drawing surface of the optical disk is irradiated with the laser beam and altered, thereby drawing a desired image on the drawing surface of the optical disk.

Japanese Unexamined Patent Application Publication No. 2003-203348 and Japanese Patent Translation Publication No. 2006-512718 each disclose a technique of applying a laser beam onto the thermosensitive surface of an optical disk by employment of an optical pickup section, thereby forming an image thereon. Note that Japanese Unexamined Patent Application Publication No. 2003-187471 discloses a technique of correcting a drive waveform input to a stepping motor so as to realize traverse feeding with high accuracy.

In the case of forming the desired image (picture images, characters, and the like) on the drawing surface of the optical disk, there is a strong demand for suppressing degradation in quality of an image to be finally drawn.

For example, when the desired image is drawn on the drawing surface of the optical disk by the application of the laser beam, the optical pickup section is required to move stepwise with high accuracy. However, the drawing surface of the optical disk has no mark indicating a position within the surface. Accordingly, in order to suppress the degradation in quality of the image to be finally drawn, it is necessary to increase the feed accuracy of a feed mechanism for the optical pickup section. Actually, however, there is a problem in that it is difficult to increase the feed accuracy of the feed mechanism itself of the optical pickup section due to various causes (for example, machining accuracy of a mechanical transmission mechanism, and variation in characteristics of a drive source).

In order to solve the above-mentioned problem, an amount of arrangement deviation of the optical pickup section with respect to a target position may be measured in advance, and the optical pickup section or an objective lens may be moved under certain conditions depending on the measurement results, thereby drawing an image on the drawing surface of the optical disk. In this case, data representing the amount of arrangement deviation of the optical pickup section may be stored in a non-volatile memory such as a flash memory according to the number of movements of the optical pickup section or the objective lens. When an amount of data which represents the amount of arrangement deviation of the optical pickup section and which is stored in the non-volatile memory is increased, however, there is a problem in that available memory space of the non-volatile memory necessary for other processing becomes insufficient.

SUMMARY

The present inventors have found a problem that memory resources are compressed due to an increase in the amount of data for use in control of the movement of an optical pickup section or an objective lens.

A first exemplary aspect of an embodiment of the present invention is a drive signal generating apparatus including: an arithmetic section that calculates an approximate expression that approximates variations of a plurality of detected values each representing one of a position of an optical pickup section and an amount of positional deviation of the optical pickup section with respect to a current target position, the position of the optical pickup section being sequentially detected when the optical pickup section moves stepwise toward a plurality of target positions set in advance on a drawing surface of a drawing target; and a drive signal generation section that generates a second drive signal synchronized with a first drive signal for causing the optical pickup section to move stepwise, the second drive signal having a signal value corresponding to an approximate value calculated by substituting a value associated with each of the plurality of target positions into the approximate expression, so as to move an optical component provided in the optical pickup section.

The necessity of storing all the detected value data items can be eliminated by calculating the approximate expression that approximates variations of the detected values. As a result, the compression of memory resources can be effectively suppressed even when the amount of data for use in control of the movement of the optical pickup section or the objective lens is increased.

A second exemplary aspect of an embodiment of the present invention is a drawing apparatus including the drive signal generating apparatus according to the first exemplary aspect of the present invention.

According to an exemplary embodiment of the present invention, it is possible to suppress the compression of memory resources due to an increase in the amount of data for use in control of the movement of the optical pickup section or the objective lens.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 11 is an explanatory diagram illustrating an example of arithmetic processing carried out by a detected value table generation section according to the second exemplary embodiment of the present invention;

DETAILED DESCRIPTION OF THE EXEMPLARY EMBODIMENTS

Figure 1:
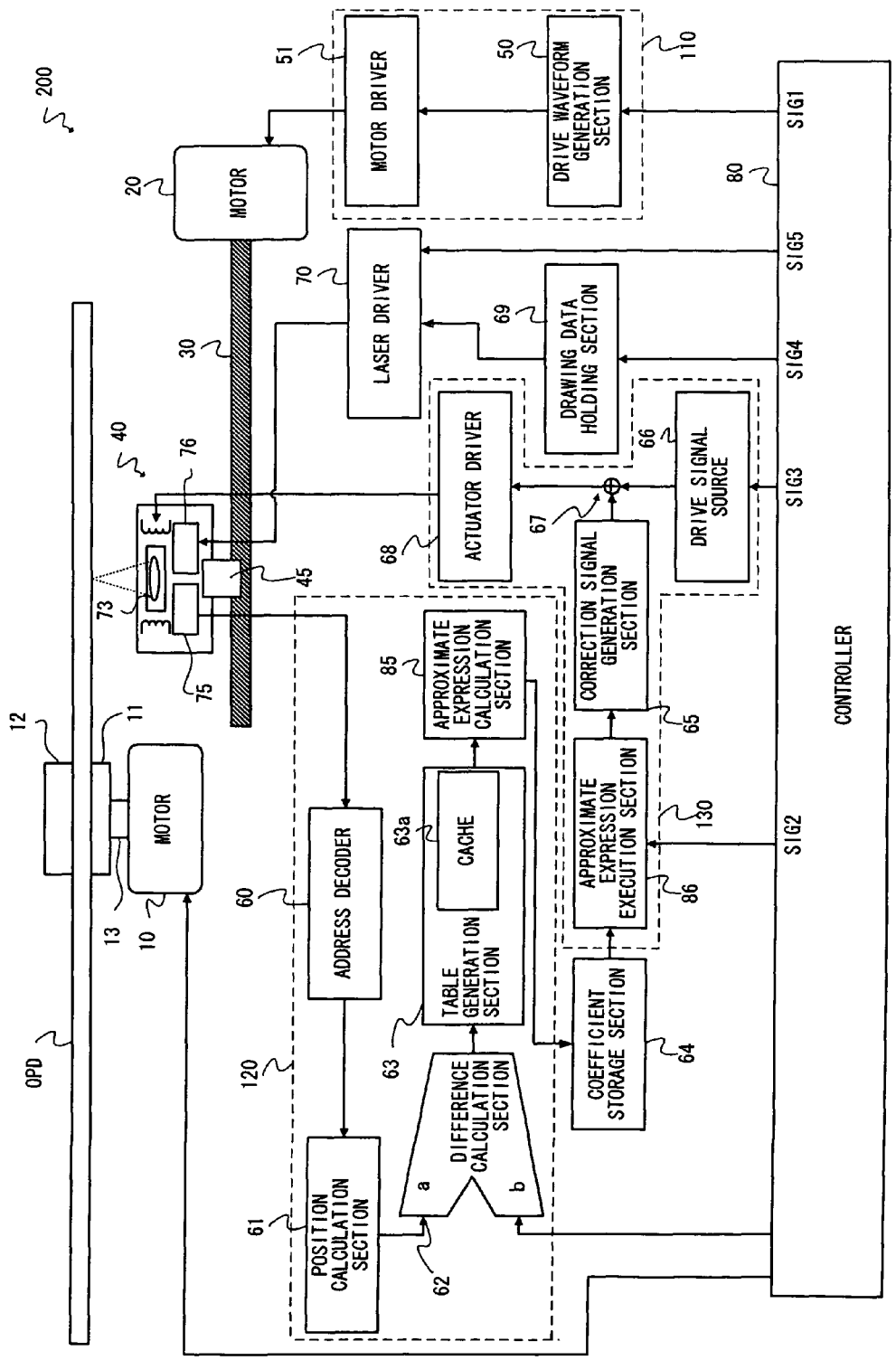
FIG. 1 is a block diagram showing the structure of a drawing apparatus according to a first exemplary embodiment of the present invention.

Hereinafter, exemplary embodiments of the present invention will be described with reference to the accompanying drawings. Note that the exemplary embodiments of the present invention are simplified for ease of explanation. The drawings are in simplified form, and the technical scope of the present invention should not be interpreted to be limited to the drawings. The drawings are shown only for the purpose of illustrating the technical concept of the present invention, and the components shown in the drawings are not to scale. The same components are denoted by the same reference symbols and redundant explanation thereof is omitted. Directional terms such as "upper", "lower", "left", and "right" are used assuming that the drawings are viewed from the front side.

First Exemplary Embodiment

Figures 2, 3:
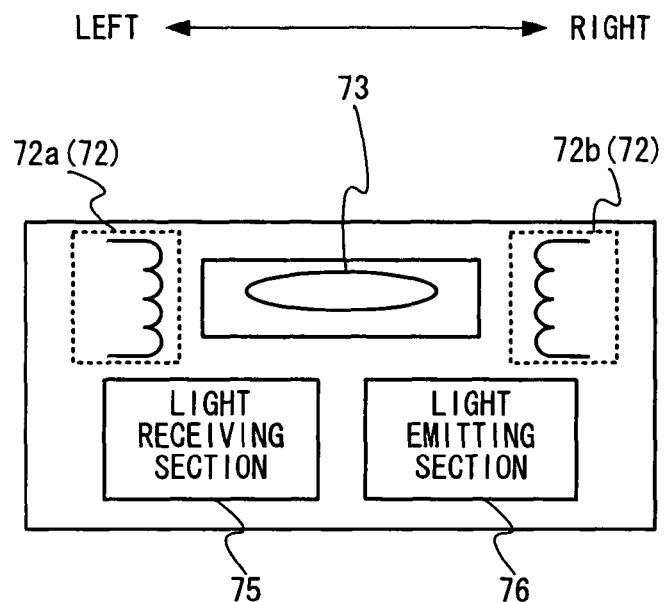
FIG. 2 is an explanatory diagram showing the structure of an optical pickup section according to the first exemplary embodiment of the present invention.
FIG. 3 is an explanatory diagram showing the structure of a detected value table according to the first exemplary embodiment of the present invention.
Figure 4:
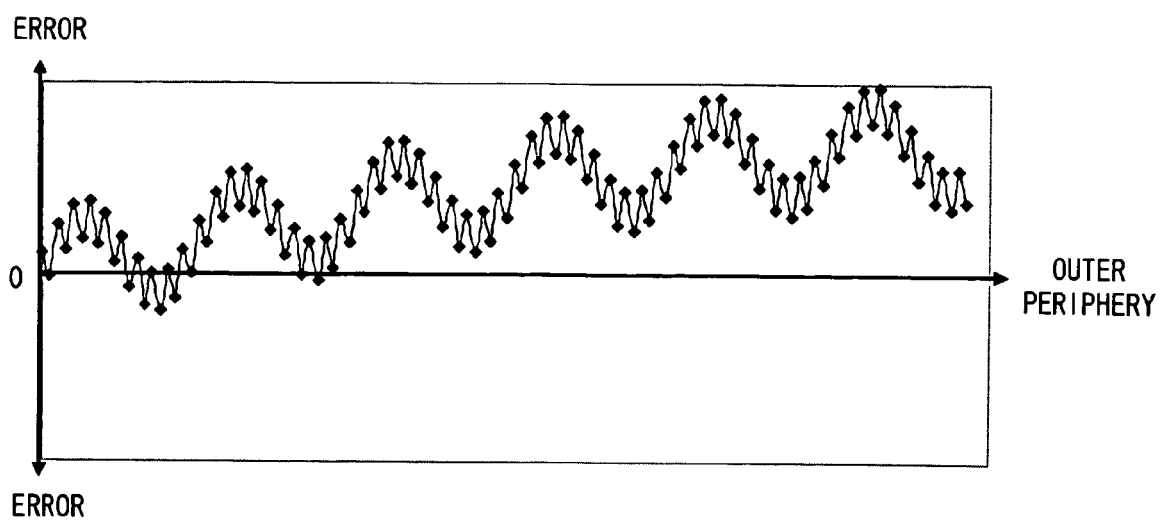
FIG. 4 is an explanatory diagram showing observation data representing difference values arranged in the order of position numbers.
Figure 5A:
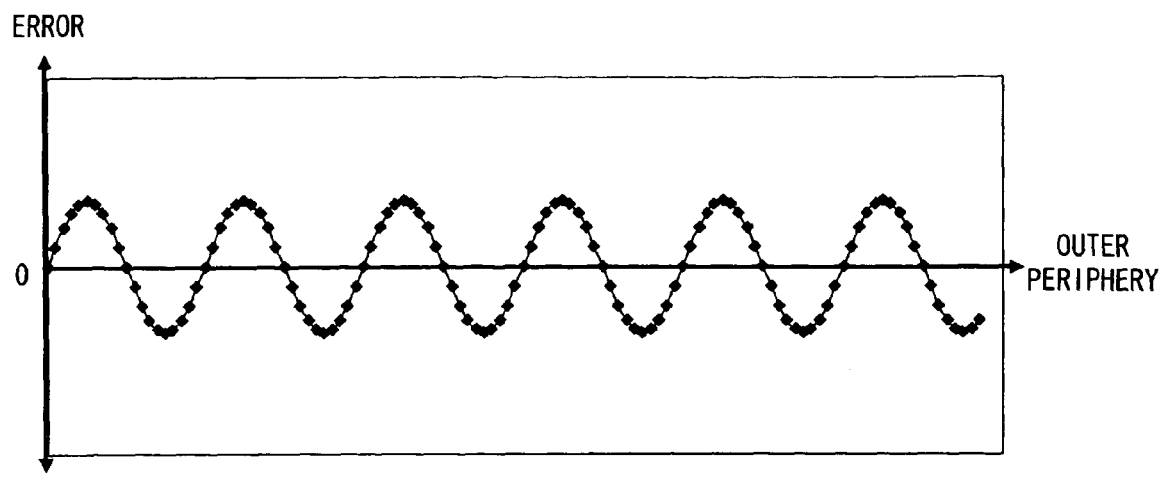
FIGS. 5A to 5C are explanatory diagrams each showing a state where observation data is divided into a plurality of frequency components.
Figure 5B:
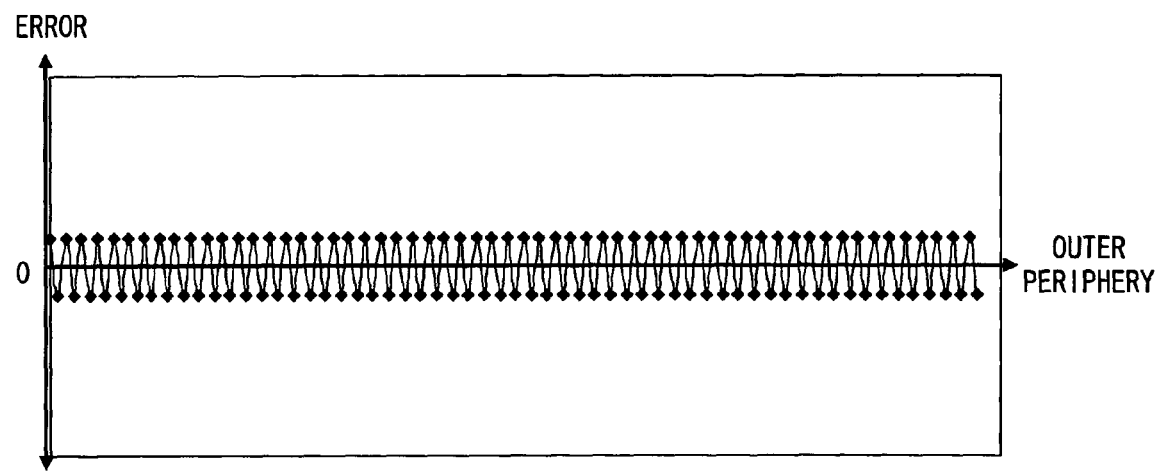
Figure 5C:
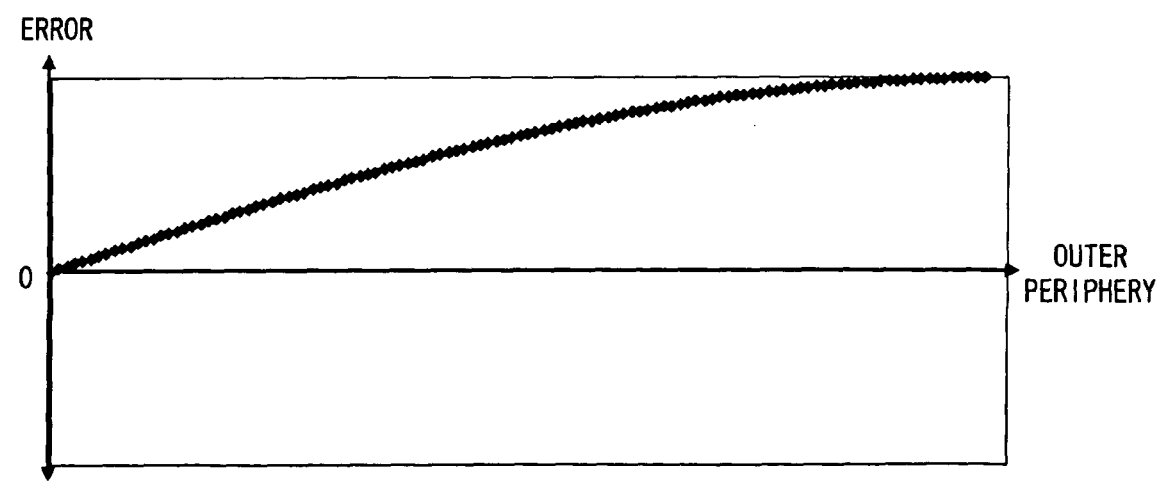
Figure 6:
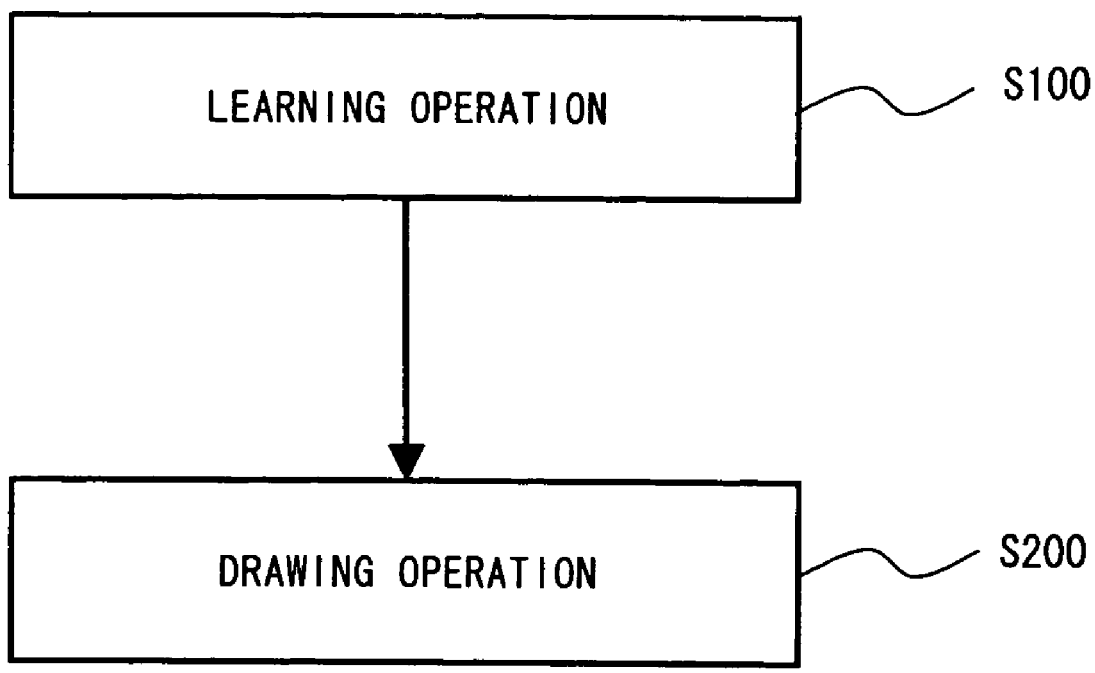
FIG. 6 is a schematic flowchart illustrating operations of the drawing apparatus according to the first exemplary embodiment of the present invention.
Figure 7A:
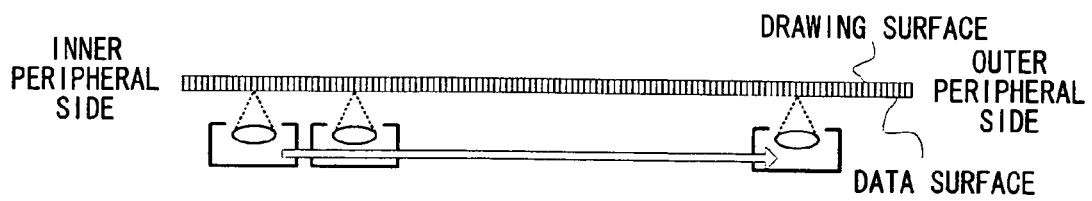
FIGS. 7A to 7C are explanatory diagrams each showing an operation of the drawing apparatus according to the first exemplary embodiment of the present invention.
Figure 7B:
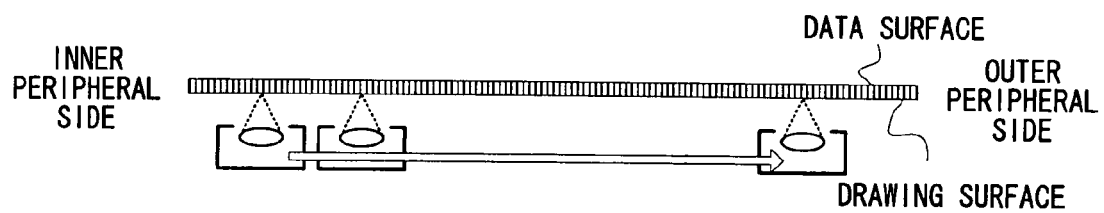
Figure 7C:
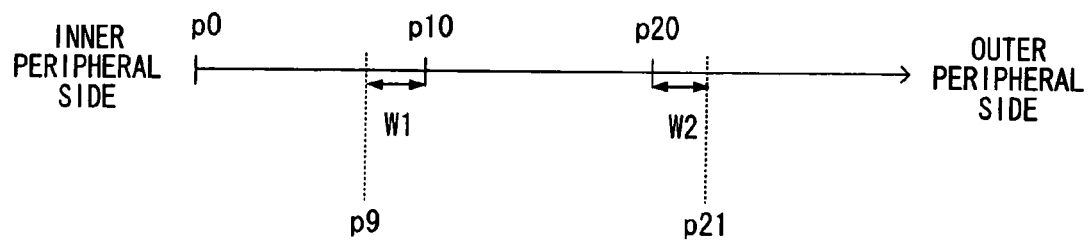
Figure 8:
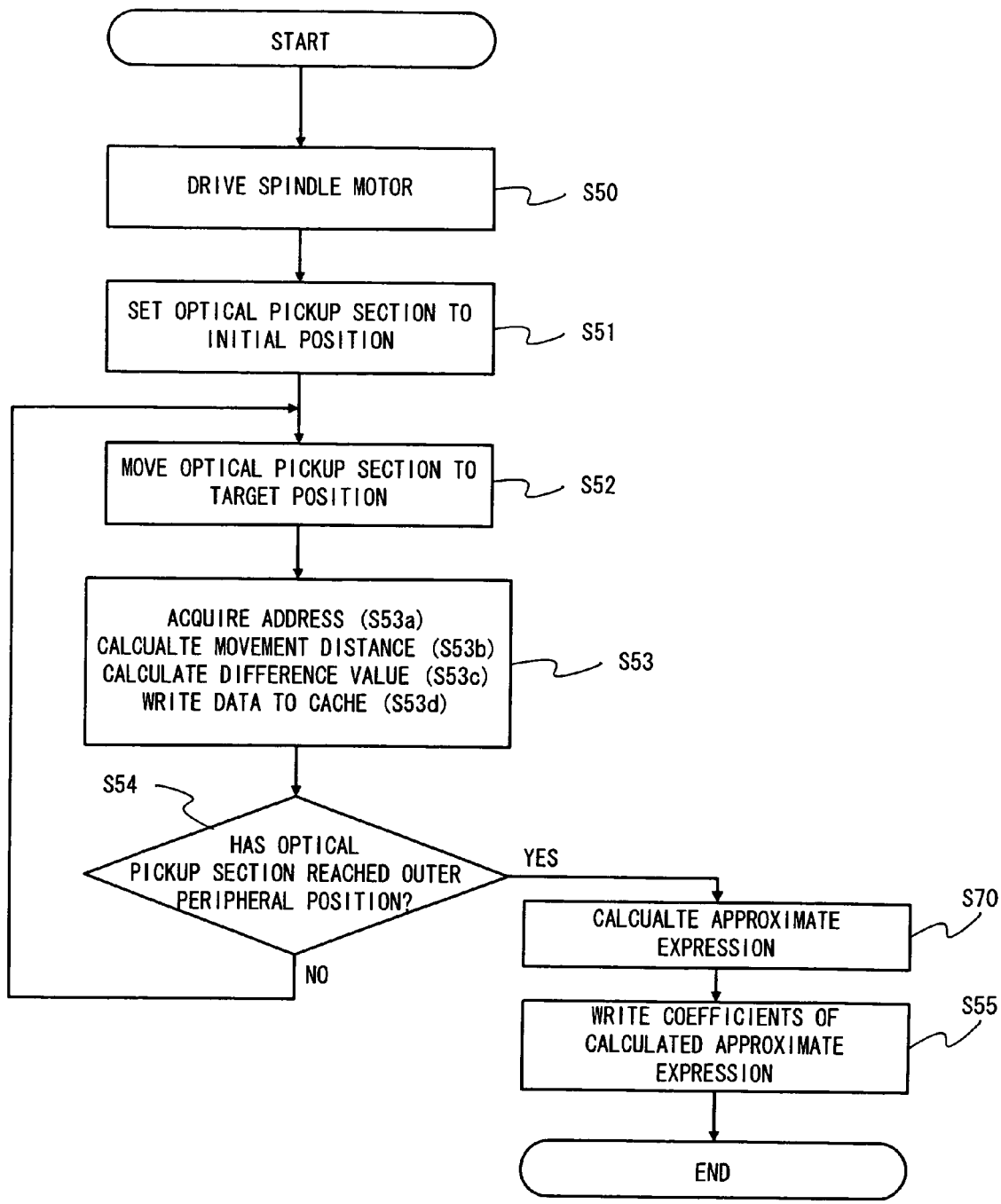
FIG. 8 is a schematic flowchart illustrating a learning operation of the drawing apparatus according to the first exemplary embodiment of the present invention.
Figure 9:
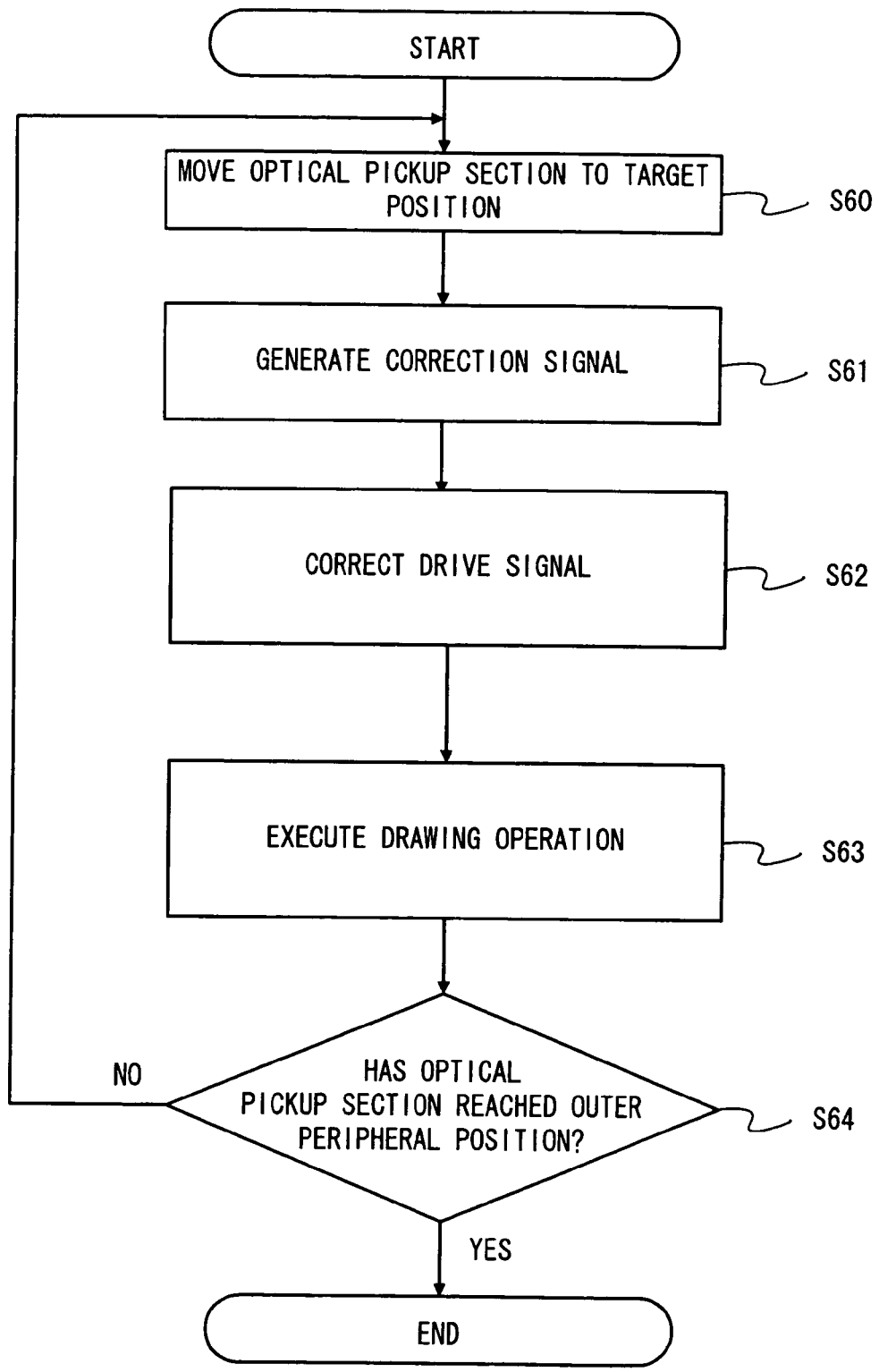
FIG. 9 is a schematic flowchart illustrating a drawing operation of the drawing apparatus according to the first exemplary embodiment of the present invention.

A first exemplary embodiment of the present invention will be described with reference to FIGS. 1 to 9. FIG. 1 is a block diagram showing the structure of a drawing apparatus according to the first exemplary embodiment. FIG. 2 is an explanatory diagram showing the structure of an optical pickup section according to the first exemplary embodiment. FIG. 3 is an explanatory diagram showing the structure of a detected value table according to the first exemplary embodiment. FIG. 4 is an explanatory diagram showing observation data representing difference values arranged in the order of position numbers. FIGS. 5A to 5C are explanatory diagrams each showing a state where the observation data is divided into a plurality of frequency components. FIG. 6 is a schematic flowchart illustrating operations of the drawing apparatus. FIGS. 7A to 7C are explanatory diagrams each illustrating an operation of the drawing apparatus. FIG. 8 is a schematic flowchart illustrating a learning operation of the drawing apparatus. FIG. 9 is a schematic flowchart illustrating a drawing operation of the drawing apparatus.

As shown in FIG. 1, a drawing apparatus 200 includes a spindle motor 10, a stepping motor 20, a feed screw 30, and an optical pickup section 40. Further, the drawing apparatus 200 includes a drive waveform generation section 50 and a motor driver 51. Furthermore, the drawing apparatus 200 includes an address decoder 60, a position calculation section 61, a difference calculation section 62, a table generation section 63, an approximate expression calculation section 85, a coefficient storage section 64, an approximate expression execution section 86, a correction signal generation section 65, a drive signal source 66, an adder 67, an actuator driver 68, a drawing data holding section 69, a laser driver 70, and a controller 80.

A drive section 110 shown in FIG. 1 includes the drive waveform generation section 50 and the motor driver 51. Likewise, an arithmetic section 120 includes the address decoder 60, the position calculation section 61, the difference calculation section 62, the table generation section 63, and the approximate expression calculation section 85. Further, a drive signal generation section 130 includes the approximate expression execution section 86, the correction signal generation section 65, the drive signal source 66, the adder 67, and the actuator driver 68.

As apparent from the following description, the drive section 110 controls the stepping motor 20 to cause the optical pickup section 40 to move stepwise in a radial direction of an optical disk OPD. The arithmetic section 120 calculates an approximate expression that approximates variations of a plurality of detected values each representing an amount of positional deviation of the optical pickup section 40 with respect to a current target position. The drive signal generation section 130 performs calculation of the approximate expression under certain conditions depending on the current target position of the optical pickup section 40, and generates a drive signal having a signal value corresponding to an approximate value obtained by the approximate expression. A description is given in more detail below.

The spindle motor 10 rotates the optical disk OPD, which is sandwiched between a lower plate 11 and an upper plate 12, in accordance with the rotation of a rotation axis 13. It is assumed that the rotation of the spindle motor 10 is controlled by the controller 80.

The stepping motor 20 is a typical magnetic motor. For example, the stepping motor 20 generates a drive force in response to two-phase drive signals.

The feed screw 30 is rotated by the drive force generated by the stepping motor 20. Along with the rotation of the feed screw 30, the optical pickup section 40 moves leftward or rightward. Thus, the movement direction of the optical pickup section 40 depends on the rotational direction of the feed screw 30. Further, the optical pickup section 40 is engaged with the feed screw 30 through an engagement section 45.

The optical pickup section 40 applies a laser beam onto a data surface of the optical disk OPD, to thereby write digital signals to the data surface of the optical disk OPD. Further, the optical pickup section 40 receives light reflected from the optical disk OPD, to thereby read the digital signals from the data surface of the optical disk OPD. Furthermore, the optical pickup section 40 applies a laser beam to a drawing surface of the optical disk OPD, to thereby form an image on the drawing surface of the optical disk OPD.

FIG. 2 shows a specific structure of the optical pickup section 40. As shown in FIG. 2, the optical pickup section 40 includes a light receiving section 75, a light emitting section 76, magnetic force applying sections (actuators) 72, and a lens (optical component) 73. As show in FIG. 2, these components are contained in a common housing. Note that the specific structure of the optical pickup section 40 can be arbitrarily selected, and is not limited to the structure shown in FIG. 2.

The light receiving section 75 includes at least a photodetector such as a photodiode, and a transimpedance circuit connected thereto. The light receiving section 75 outputs a signal (for example, voltage signal) having a value corresponding to the incident light intensity.

The light emitting section 76 is a light-emitting device such as a laser diode. The light emitting section 76 emits light having an intensity proportional to the amount of drive current controlled by the laser driver 70.

The magnetic force applying section 72 includes a coil 72a and a coil 72b. The amount of current flowing through each of the coils 72a and 72b is controlled by the actuator driver 68 so that the lens 73 is moved leftward or rightward.

The lens 73 is an optical component that converges light beams emitted from the light emitting section 76 on the optical disk OPD. Also, the lens 73 is an optical component that directs the light reflected from the optical disk OPD toward the light receiving section 75.

Returning again to FIG. 1, further description will be given below.

The address decoder 60 decodes an output signal from the light receiving section 75 into address data (address signal).

The position calculation section 61 calculates values each representing the position of the optical pickup section 40 in the radial direction of the optical disk OPD, based on the address data output from the address decoder 60. The values calculated by the position calculation section 61 include a value corresponding to a distance between an initial position of the optical pickup section 40 and a current position of the optical pickup section 40.

The difference calculation section 62 compares a value input to a first input "a" with a value input to a second input "b" and calculates a difference therebetween. The first input "a" of the difference calculation section 62 receives the value calculated by the position calculation section 61. The second input "b" of the difference calculation section 62 receives the predetermined value set by the controller 80.

As described later, when the drawing apparatus 200 carries out a learning operation, the following signals are respectively input to the first input "a" and the second input "b" of the difference calculation section 62. That is, the first input "a" of the difference calculation section 62 receives a signal having a value corresponding to the current position of the optical pickup section 40 in the radial direction of the optical disk OPD (hereinafter, also referred to simply as "the current position of the optical pickup section"). The second input "b" of the difference calculation section 62 receives a signal having a value corresponding to the target position of the optical pickup section 40 in the radial direction of the optical disk OPD (hereinafter, also referred to simply as "the target position of the optical pickup section").

Note that a plurality of target positions are set on the drawing surface of the optical disk OPD along the movement direction of the optical pickup section 40. Accordingly, the controller 80 receives the signals each having the value corresponding to the target position, thereby sequentially setting the predetermined values to be input to the second input "b" of the optical pickup section 40.

The difference calculation section 62 calculates a difference between two input signal values and outputs the calculated difference. The difference calculation performed by the difference calculation section 62 makes it possible to detect how much the current position of the optical pickup section 40 is deviated from the target position. Each difference value (detected value) calculated by the difference calculation section 62 corresponds to an amount of deviation between the current position and the target position of the optical pickup section 40.

The table generation section 63 stores the difference values sequentially output from the difference calculation section 62 in a detected value table (see FIG. 3) stored in a cache (data holding area) 63a.

FIG. 3 shows a specific structure of the detected value table. As shown in FIG. 3, a plurality of difference values are arranged in the order of position numbers and stored in the table. The difference values are error values each reflecting the amount of deviation between the target position and the current position of the optical pickup section 40. A number of difference values corresponding to the number of target positions are stored in the detected value table. Further, each of the difference values is associated with the corresponding target position and stored in the detected value table. In this case, the position numbers function as identification values each indicating the target positions.

The approximate expression calculation section 85 calculates an approximate expression that approximates variations of the difference values arranged in the order of the position numbers based on the detected value table stored in the cache 63a. In this case, the approximate expression calculation section 85 performs Fourier transform on the data stored in the detected value table. The following expression (1) including predetermined coefficients is obtained by the Fourier transform. Note that, in this example, the variations of the difference values are approximated using three periodic functions.

It is assumed that primary expressions (expressions into which no specific coefficient is substituted) for the expression (1) are set in advance in the approximate expression calculation section 85 based on measurement data.

$$X = [a \sin b\theta + c \cos d\theta] + [e \sin f\theta + g \cos h\theta] + [i \sin j\theta + k \cos l\theta] \quad (1)$$

where x represents an approximated difference value, and θ represents a variation of a value corresponding to a target position.

Functions of the approximate expression calculation section 85 will be described with reference to FIGS. 4 to 5C. FIG. 4 is an explanatory diagram showing observation data representing difference values arranged in the order of the position numbers. FIG. 4 is also a graph obtained by plotting the values of FIG. 3. FIGS. 5A to 5C are explanatory diagrams each showing a state where the observation data is divided into a plurality of frequency components.

According to the expression (1), the observation data shown in FIG. 4 is approximated using three frequency components shown in FIGS. 5A to 5C. The periodic function [a Sin bθ+c Cos dθ] of the first term of the expression (1) represents the frequency component shown in FIG. 5A. In this case, it is assumed that a=0.7, b=π/30, c=0, and d=0. The periodic function [e Sin fθ+g Cos hθ] of the second term of the expression (1) represents the frequency component shown in FIG. 5B. In this case, it is assumed that e=0, f=0, g=0.3, and h=π/3. The periodic function [i Sin jθ+k Cos lθ] of the third term of the expression (1) represents the frequency component shown in FIG. 5C. In this case, it is assumed that i=2, j=π/720, k=0, and l=0.

In this manner, the approximate expression calculation section 85 approximates the variations of the difference values of the observation data by calculating the approximate expression including three periodic functions. Then, the approximate expression calculation section 85 writes the coefficients of the calculated approximate expression into the coefficient storage section 64. Note that, when the number of periodic functions included in an approximate expression is increased, it is possible to obtain an approximate expression that represents data more approximate to the observation data.

Referring again to FIG. 1, further description will be given below.

The coefficient storage section 64 stores the coefficients calculated by the approximate expression calculation section 85. The coefficient storage section 64 is a non-volatile memory. According to an exemplary embodiment of the present invention, the coefficients of the expression (1) are held in the non-volatile memory, but all the data items provided in the detected value table are not necessarily held in the non-volatile memory. In this case, the coefficients of the expression (1) are held in the non-volatile memory. As a result, an increase in the amount of used memory space of the non-volatile memory can be effectively suppressed. That is, the compression of memory resources due to an increase in the amount of data for use in control of the movement of the optical pickup section or an objective lens can be effectively suppressed. Thus, the drawing with high precision and wide-range drawing can be achieved.

The approximate expression execution section 86 reads coefficients "a" to "l" stored in the coefficient storage section 64 to obtain the solution of the expression (1) in response to a control signal sig2 from the controller 80. The difference value X obtained by performing the approximation calculation in this manner (hereinafter, also referred to simply as "approximate value X") is calculated. Note that the approximate expression execution section 86 calculates the approximate value X by sequentially substituting variations θ of the values each corresponding to the target position into the expression (1).

For example, the approximate expression execution section 86 substitutes the variation θ (for example, θ=1) having a value corresponding to a first target position, into the expression (1), in response to the control signal sig2 from the controller 80. Thus, the difference value X representing an amount of positional deviation of the optical pickup section 40 with respect to the first target position is calculated. Then, the approximate expression execution section 86 substitutes the variation θ (for example, θ=2) having a value corresponding a second target position, which is the next target position, into the expression (1), in response to the control signal sig2 from the controller 80. Thus, the difference value X representing an amount of positional deviation of the optical pickup section 40 with respect to the second target position is calculated.

As in the case of the approximate expression calculation section 85, it is assumed that the primary expressions (expressions into which no specific coefficient is substituted) for the expression (1) are set in advance in the approximate expression execution section 86. The control signal sig2 is output from the controller in synchronization with a control signal sig1. Accordingly, the movement of the optical pickup section 40 and the movement of the lens 73 provided in the optical pickup section 40 are associated with each other at each target position and carried out.

The correction signal generation section 65 generates a correction signal according to the approximate value X calculated by the approximate expression execution section 86.

The drive signal source 66 outputs a drive signal for displacing the lens 73 in response to a control signal sig3 from the controller 80.

The adder 67 adds the drive signal and the correction signal. When both the correction signal and drive signal are numerical signals, the adder 67 adds the values of both signals. Then, the adder 67 outputs a signal indicative of a value obtained by adding these values (for example, a voltage signal corresponding to the value obtained by adding these values). Both the correction signal and drive signal may be voltage signals. The mode of displacement of the lens 73 depends on the waveform of a signal obtained by adding those signals.

The actuator driver 68 controls the magnetic force applying section 72 in response to the input drive signal. For example, the actuator driver 68 controls the magnetic force applying section 72 according to a result of comparison between the voltage signal output from the adder 67 and a reference voltage. Specifically, when the voltage signal output from the adder 67 is equal to or higher than the reference voltage, the actuator driver 68 controls the magnetic force applying section 72 to move the lens 73 leftward. When the voltage signal output from the adder 67 is lower than the reference voltage, the actuator driver 68 controls the magnetic force applying section 72 to move the lens 73 rightward. Thus, the movement amount of the lens 73 corresponds to a voltage difference between the voltage signal output from the adder 67 and the reference voltage.

The drawing data holding section 69 outputs drawing data held therein in response to a control signal sig4 from the controller 80. Note that the laser driver 70 drives the light emitting section 76 based on the received drawing data. In accordance with the drawing data held in the drawing data holding section 69, a desired image is drawn on the drawing surface of the optical disk OPD. Further, in response to a control signal sig5 from the controller 80, the laser driver 70 drives the light emitting section 76.

The drive waveform generation section 50 generates a drive waveform in response to the control signal sig1 from the controller 80. For example, the drive waveform generation section 50 generates sine waves (sin/cos) with 90 degrees phase difference, as drive pulse voltage. The motor driver 51 drives the stepping motor 20 according to the received drive waveform. Note that the drive waveform generation section 50 functions as a drive signal generation section that generates drive signals for moving the optical pickup section 40 stepwise sequentially to the plurality of target positions set in advance on the drawing surface of the optical disk OPD.

The controller 80 outputs the control signal sig1 to the drive waveform generation section 50, the control signal sig2 to the approximate expression execution section 86, the control signal sig3 to the drive signal source 66, the control signal sig4 to the drawing data holding section 69, and the control signal sig5 to the laser driver 70.

Next, the connection relationship among the components is described. An output of the light receiving section 75 is connected to an input of the address decoder 60. An output of the address decoder 60 is connected to an input of the position calculation section 61. An output of the position calculation section 61 is connected to the first input "a" of the difference calculation section 62. The second input "b" of the difference calculation section 62 receives a signal set by the controller 80. An output of the difference calculation section 62 is connected to an input of the table generation section 63. An output of the table generation section 63 is connected to an input of the approximate expression calculation section 85. An output of the approximate expression calculation section 85 is connected to an input of the coefficient storage section 64. An output of the coefficient storage section 64 is connected to an input of the approximate expression execution section 86. An output of the approximate expression execution section 86 is connected to an input of the correction signal generation section 65. An output of the correction signal generation section 65 is connected to an input of the adder 67. An output of the drive signal source 66 is connected to the input of the adder 67. An output of the adder 67 is connected to an input of the actuator driver 68. An output of the actuator driver 68 is connected to the magnetic force applying section 72. An output of the drawing data holding section 69 is connected to an input of the laser driver 70. An output of the laser driver 70 is connected to the light emitting section 76. An output of the drive waveform generation section 50 is connected to an input of the motor driver 51. An output of the motor driver 51 is connected to the stepping motor 20.

Referring to FIG. 6, operations of the drawing apparatus 200 are described.

As shown in FIG. 6, the drawing apparatus 200 carries out a learning operation first (S100). The approximate expression (1) is calculated by carrying out the learning operation.

At the time of learning operation, the optical disk OPD is disposed in such a manner that the data surface of the optical disk OPD faces the optical pickup section 40 as shown in FIG. 7A. The optical pickup section 40 moves from an inner peripheral side to an outer peripheral side of the optical disk OPD. The current position of the optical pickup section 40 is detected by reading the address data from the data surface of the optical disk OPD. Note that the vertically-striped pattern of the optical disk OPD illustrated in FIG. 7A schematically shows tracks formed on the optical disk OPD.

As is well known, the data surface of the optical disk OPD has spiral tracks formed thereon. Each track has a plurality of data storage areas formed thereon. Address data is imparted to the data storage areas of each track in advance.

Next, the drawing apparatus 200 carries out a drawing operation (S200). At the time of drawing operation, the optical disk OPD is disposed in such a manner that the drawing surface of the optical disk OPD faces the optical pickup section 40 as shown in FIG. 7B. The optical pickup section 40 moves from the inner peripheral side to the outer peripheral side of the optical disk OPD.

During the drawing operation described above, the drawing apparatus 200 generates a correction signal based on the difference value X obtained by calculating the approximate expression (1), and corrects the signal value of the drive signal output from the drive signal source 66, by using the correction signal. The optical pickup section 40 is moved toward the next target position by the stepping motor 20, and the lens 73 is then moved using the corrected drive signal. As a result, the arrangement deviation of the optical pickup section 40 can be effectively corrected. More specifically, along with the movement of the lens 73, the spot position of a laser beam that is formed on the drawing surface of the optical disk OPD is changed. Accordingly, the arrangement deviation of the optical pickup section 40 due to the stepping motor 20 can be effectively corrected.

The above description is supplemented by referring to FIG. 7C.

First, it is assumed that the optical pickup section 40 is disposed at a position p0. The next target position of the optical pickup section 40 is a position p10. It is, however, assumed that the optical pickup section 40 has only reached a position p9 due to product variation or the like. In this case, an arrangement deviation corresponding to an interval W1 between the current position p9 and the target position p10 occurs in the optical pickup section 40. When the optical pickup section 40 carries out the drawing operation in this situation, an image is to be drawn on the inner peripheral side of a target area.

It is assumed that the next target position of the optical pickup section 40 is a position p20. It is, however, assumed that the optical pickup section 40 has actually moved to a position p21 passing through the target position p20 due to product variation or the like. In this case, an arrangement deviation corresponding to an interval w2 between the current position p21 and the target position p20 occurs in the optical pickup section 40. When the optical pickup section 40 carries out the drawing operation in this situation, an image is to be drawn on the outer peripheral side of the target area.

According to an exemplary embodiment of the present invention, the drawing apparatus 200 carries out the learning operation to thereby detect the arrangement errors w1 and w2 in advance. During the drawing operation, the drawing apparatus 200 displaces the lens 73 provided in the optical pickup section 40 according to the value indicating the arrangement error obtained by the learning operation. When the position of the lens is displaced according to the degree of the arrangement deviation detected in advance during the drawing operation, the arrangement deviation of the optical pickup section 40 due to the stepping motor 20 can be effectively corrected. Note that, since the coefficients of the approximate expression generated are stored in the non-volatile memory, it is not necessary for the drawing apparatus 200 to carry out the learning operation every time the drawing operation is carried out.

The above description is further supplemented by referring to FIG. 7C. When the optical pickup section 40 is located at the position p9, the drawing apparatus 200 displaces the lens 73 so as to carry out the drawing operation in the same manner as in the case where the optical pickup section 40 is located at the target position p10. Further, when the optical pickup section 40 is located at the position p21, the drawing apparatus 200 displaces the lens 73 so as to carry out the drawing operation in the same manner as in the case where the optical pickup section 40 is located at the target position p20. Thus, when the position of the lens 73 is shifted during the drawing operation, the arrangement deviation of the optical pickup section 40 due to the stepping motor 20 can be effectively corrected.

Referring to FIG. 8, a description is given of the leaning operation carried out by the drawing apparatus 200. It is assumed that the optical disk OPD is disposed in the manner as shown in FIG. 7A.

First, the controller 80 drives the spindle motor 10 (S50).

Next, the optical pickup section 40 is set to the initial position (S51). Specifically, in response to the control signal sig1 from the controller 80, the drive waveform generation section 50 generates a drive waveform, and outputs the generated drive waveform to the motor driver 51. The motor driver 51 drives the stepping motor 20 according to the received drive waveform. The drive force generated by the stepping motor 20 in this manner is transmitted to the optical pickup section 40 through a power transmission system including the feed screw 30 and the engagement section 45. Then, the optical pickup section 40 is located at the initial position. Note that, in this case, a focus servo signal and a track servo signal are applied so as to acquire the address data from the data surface of the optical disk OPD.

After that, the optical pickup section 40 is moved toward the target position (S52). Specifically, in response to the control signal sig1 from the controller 80, the drive waveform generation section 50 generates a drive waveform, and outputs the generated drive waveform to the motor driver 51. The motor driver 51 drives the stepping motor 20 according to the received drive waveform. The drive force generated by the stepping motor 20 in this manner is transmitted to the optical pickup section 40 through the power transmission system. Then, the optical pickup section 40 is moved toward the target position by a predetermined interval.

After that, a step of acquiring the address data, a step of calculating the movement distance, a step of calculating the difference value, and a step of writing data to the cache are sequentially executed in the stated order (S53).

The drawing apparatus 200 executes the step of acquiring address data in the following manner (S53a). The laser driver 70 drives the light emitting section 76 in response to the control signal sig5 from the controller 80. In accordance with the control by the laser driver 70, the light emitting section 76 applies a laser beam onto the data surface of the optical disk OPD. The reflected light from the data surface of the optical disk OPD is received by the light receiving section 75. The output signal from the light receiving section 75 is converted to address data by the address decoder 60. In this manner, the address data representing the current position of the optical pickup section 40 is acquired.

Then, the drawing apparatus 200 executes the step of calculating the movement distance (S53b). Specifically, the position calculation section 61 calculates the movement distance of the optical pickup section 40 based on the address data output from the address decoder 60. The term "movement distance" refers to a movement distance of the optical pickup section 40 from the initial position of the optical pickup section 40. The movement distance is calculated by subtracting a value indicating the initial position of the optical pickup section 40 from a value indicating the current position of the optical pickup section 40. Note that it is assumed that the address data representing the position of the optical pickup section 40 is acquired when the optical pickup section 40 is located at the initial position in the above-mentioned step S51.

Then, the drawing apparatus 200 executes the step of calculating the difference value (S53c). Specifically, the difference calculation section 62 calculates the difference value between the value calculated by the position calculation section 61 and a predetermined value. The predetermined value input to the second input "b" of the difference calculation section 62 has a value corresponding to a distance between the initial position of the optical pickup section 40 and the current target position of the optical pickup section 40. By performing subtraction between the value calculated by the position calculation section 61 and the predetermined value, the amount of positional deviation between the current position of the optical pickup section 40 and the target position can be calculated.

The drawing apparatus 200 writes the difference value thus calculated to the cache (S53d). Specifically, the table generation section 63 writes the difference value in the detected value table stored in the cache 63a.

Then, the drawing apparatus 200 determines whether the optical pickup section 40 has reached an outer peripheral position (S54). In this case, the number of target positions is given. Accordingly, the drawing apparatus 200 determines whether the number of step movements of the optical pickup section 40 has reached the predetermined number, thereby determining whether the optical pickup section 40 has reached the final target position.

In the case where the optical pickup section 40 has not reached the final target position, the process returns to the above-mentioned step S52. By repeating the process, the cache 63a of the table generation section 63 holds a plurality of difference values corresponding to the number of movements (number of target positions) of the optical pickup section 40.

In the case where the optical pickup section 40 has reached the final target position, the drawing apparatus 200 calculates the approximate expression that approximates variations of the difference values arranged in the order of position numbers, based on the detected value table stored in the cache 63a. In this case, the approximate expression calculation section 85 performs Fourier transform on the data stored in the detected value table. By performing the Fourier transform, the expression (1) including the predetermined coefficients is calculated.

$$X = [a \sin b\theta + c \cos d\theta] + [e \sin f\theta + g \cos h\theta] + [i \sin j\theta + k \cos l\theta] \quad (1)$$

where X represents an approximated difference value, and θ represents a variation of a value corresponding to a target position.

Then, the approximate expression calculation section 85 of the drawing apparatus 200 writes the coefficients of the expression (1) to the coefficient storage section 64. Thus, the learning operation of the drawing apparatus 200 is completed.

After completion of the learning operation, the approximate expression calculation section 85 stores the coefficients of the expression (1) in the coefficient storage section 64. It is not necessary to store the detected value table itself in the non-volatile memory. Accordingly, the compression of memory resources due to an increase in the amount of data for use in control of the step movement of the optical pickup section 40 can be effectively suppressed.

Referring to FIG. 9, the drawing operation of the drawing apparatus 200 is described.

First, the drawing apparatus 200 moves the optical pickup section 40 toward the predetermined target position (S60). Specifically, in response to the control signal sig1 from the controller 80, the drive waveform generation section 50 generates a drive waveform and outputs the generated drive waveform to the motor driver 51. The motor driver 51 drives the stepping motor 20 according to the received drive waveform. The drive force generated by the stepping motor 20 in this manner is transmitted to the optical pickup section 40 through the power transmission system. Then, the optical pickup section 40 is moved toward the predetermined target position by the predetermined interval.

Then, the drawing apparatus 200 carries out generation of the correction signal (S61). Specifically, in response to the control signal sig2 from the controller 80, the approximate expression execution section 86 reads coefficients "a" to "l" stored in the coefficient storage section 64, and calculates the solution of the expression (1) by substituting the variation θ of the value corresponding to the current target position into the expression (1). In this manner, the difference value X corresponding to the current target position is calculated. The approximate values X to be calculated by the approximate expression execution section 86 are sequentially calculated and associated with the target positions. After that, the correction signal generation section 65 generates a correction signal indicative of a value corresponding to the difference value X calculated by the approximate expression execution section 86.

Then, the drawing apparatus 200 carries out correction of the drive signal (S62). Specifically, the adder 67 adds the drive signal output from the drive signal source 66 and the correction signal generated by the correction signal generation section 65, in response to the control signal sig3 from the controller 80. In this manner, the drive signal output from the drive signal source 66 is corrected by the correction signal generated by the correction signal generation section 65, and the corrected drive signal is input to the actuator driver 68.

When the output of the adder 67 is connected to the actuator driver 68, the lens is displaced in accordance with the output. Specifically, the actuator driver 68 controls the magnetic force applying section 72 in response to the input drive signal to move the lens 73. When the position of the lens 73 is displaced according to the corrected drive signal, the effect of the arrangement deviation of the optical pickup section 40 can be effectively eliminated.

Then, the drawing apparatus 200 carries out the drawing operation (S63). Specifically, the controller 80 outputs the control signal sig4 to the drawing data holding section 69. In response to the control signal sig4, the drawing data holding section 69 outputs the drawing data held therein to the laser driver 70. After that, the laser driver 70 controls the light emitting section 76 based on the received drawing data. Thus, the desired image is formed on each track of the drawing surface of the optical disk OPD.

Then, the drawing apparatus 200 determines whether the optical pickup section 40 has reached the outer peripheral position (S64). Specifically, the controller 80 determines whether the number of step movements of the optical pickup section 40 has reached the predetermined number, thereby determining whether the optical pickup section 40 has reached the final target position.

In the case where the optical pickup section 40 has not reached the final target position, the process returns to the above-mentioned step S60. Specifically, the optical pickup section 40 is moved toward the next target position (S60). By repeating the process, the desired image is formed on the drawing surface of the optical disk.

In the case where the optical pickup section 40 has reached the final target position, the drawing apparatus 200 completes the drawing operation.

As apparent from the above description, according to an exemplary embodiment of the present invention, it is not necessary to store the detected value table itself in the non-volatile memory. Accordingly, the compression of memory sources due to an increase in the amount of data for use in control of the step movement of the optical pickup section 40 can be effectively suppressed.

Further, according to an exemplary embodiment of the present invention, the arrangement error of the optical pickup section 40 due to the stepping motor 20 is detected in advance during the learning operation carried out by the drawing apparatus 200. The drawing apparatus 200 displaces the lens 73, which is provided in the optical pickup section 40, during the drawing operation according to an error value indicating the arrangement error of the optical pickup section 40 that is detected during the learning operation. In accordance with the displacement of the lens 73, a spot position of a laser beam radiated on the drawing surface is changed. As a result, the effect of the arrangement deviation of the optical pickup section 40 due to the stepping motor 20 can be effectively eliminated. That is, even when the drawing surface of the optical disk has no mark indicating positional information, degradation in quality of the image to be finally drawn can be suppressed independently of the feed accuracy of the feed mechanism itself of the optical pickup section.

Second Exemplary Embodiment

Figure 10:
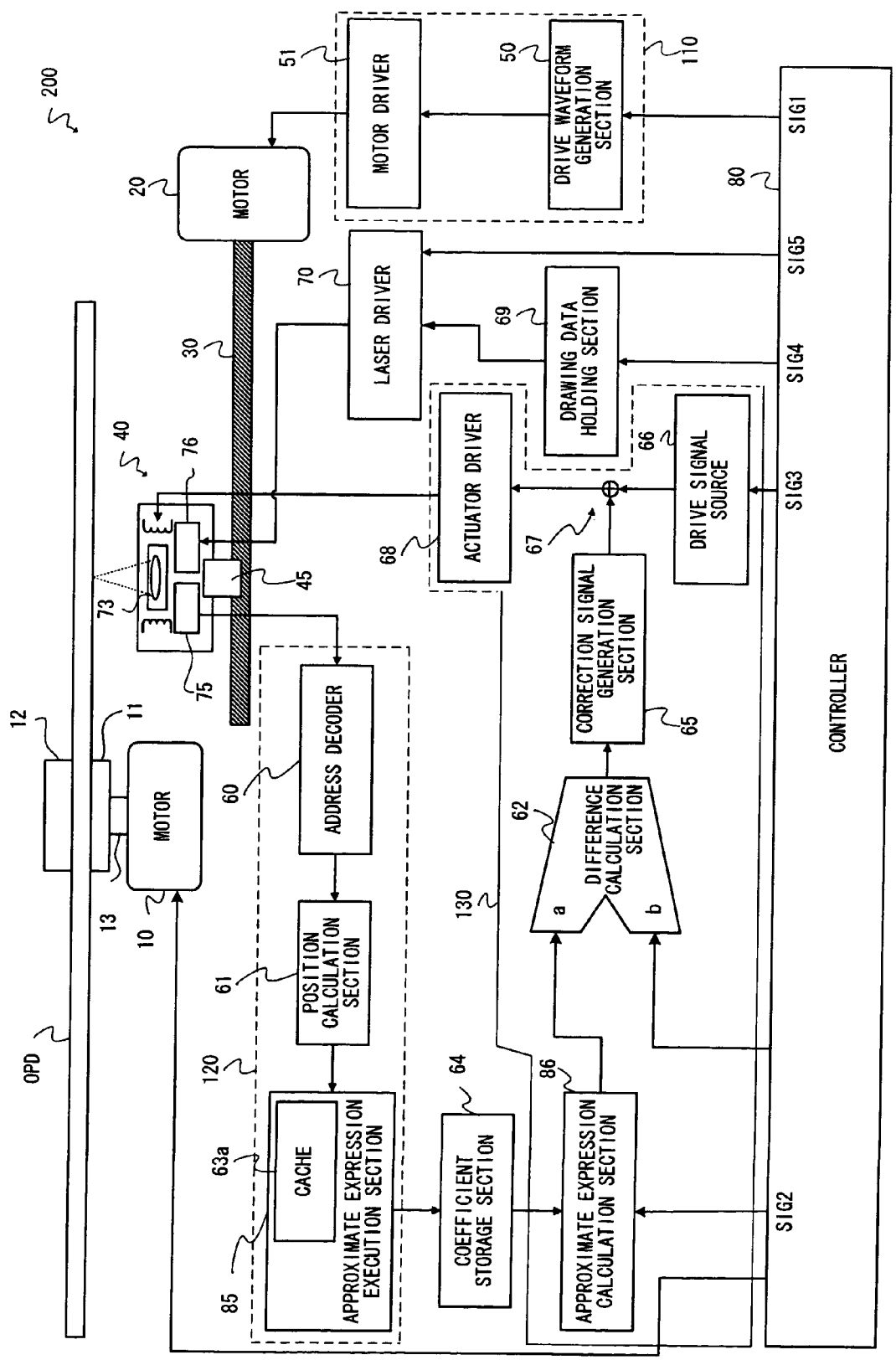
FIG. 10 is a schematic flowchart illustrating a learning operation of a drawing apparatus according to a second exemplary embodiment of the present invention.
Figure 12:
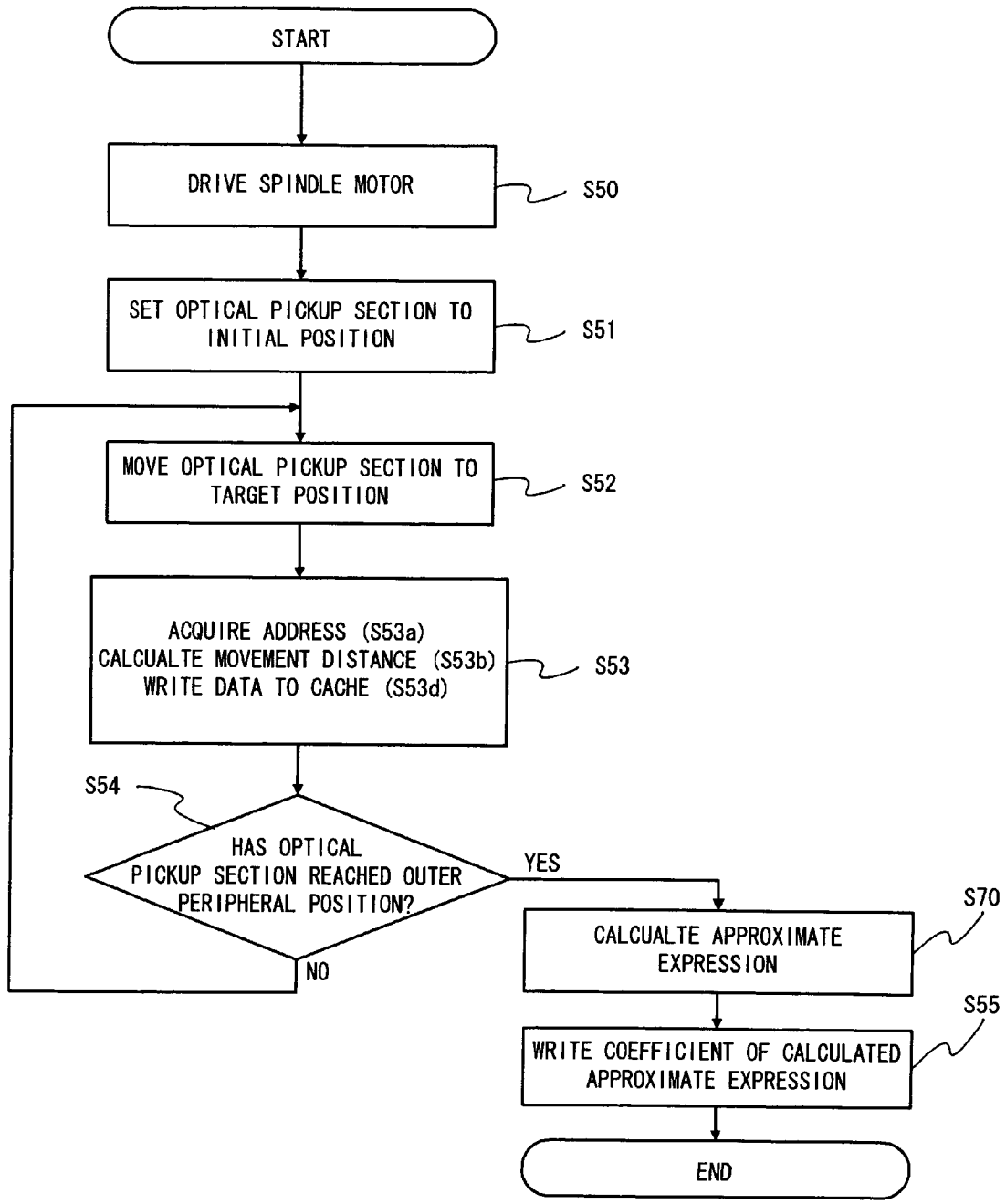
FIG. 12 is a schematic flowchart illustrating a learning operation of the drawing apparatus according to the second exemplary embodiment of the present invention.
Figure 13:
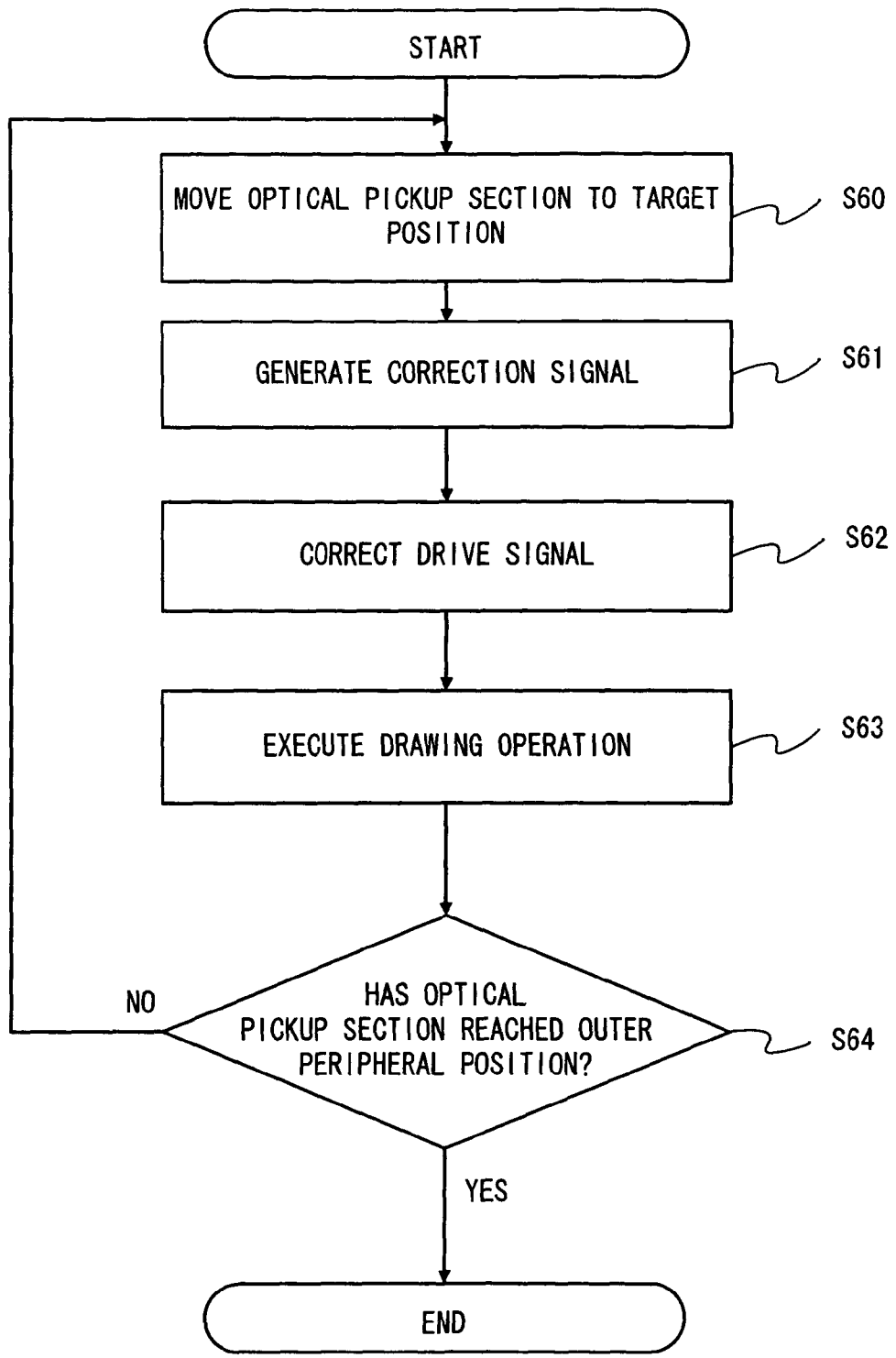
FIG. 13 is a schematic flowchart illustrating a drawing operation of the drawing apparatus according to the second exemplary embodiment of the present invention.

A second exemplary embodiment of the present invention will be described with reference to FIGS. 10 to 13. FIG. 10 is a block diagram showing the structure of a drawing apparatus according to the second exemplary embodiment. FIG. 11 is an explanatory diagram showing the structure of a detected value table according to the second exemplary embodiment. FIG. 12 is a schematic flowchart illustrating a learning operation of the drawing apparatus. FIG. 13 is a schematic flowchart illustrating a drawing operation of the drawing appara-
tus. The first and second exemplary embodiments can be combined as desirable by one of ordinary skill in the art.

As shown in FIG. 10, according to an exemplary embodiment of the present invention, the approximate expression calculation section 85 is connected between the position calculation section 61 and the coefficient storage section 64. Further, the approximate expression execution section 86 and the difference calculation section 62 are connected between the coefficient storage section 64 and the correction signal generation section 65.

Unlike the first exemplary embodiment, the drawing apparatus 200 according to the second exemplary embodiment calculates an approximate expression that approximates variations of values (values each indicating the absolute position of the optical pickup section 40 in the radial direction of the optical disk OPD) directly calculated by the position calculation section 61. Further, the drawing apparatus 200 stores coefficients of the calculated approximate expression in the coefficient storage section 64. Also in this case, the same effects as those described in the first exemplary embodiment can be obtained. The effects will be described below in more detail. Note that a duplicate explanation of the first exemplary embodiment is partially or entirely omitted.

The position calculation section 61 calculates a value indicating the position of the optical pickup section 40 in the radial direction of the optical disk OPD based on the address data output from the address decoder 60. The value calculated by the position calculation section 61 (hereinafter, also referred to simply as "calculated value" in this exemplary embodiment) has a value corresponding to a distance between the initial position of the optical pickup section 40 and the current position of the optical pickup section 40.

The approximate expression calculation section 85 writes the calculated values (detected values) sequentially calculated by the position calculation section 61 to the cache 63a. As a result, the detected value table shown in FIG. 11 is created.

FIG. 11 shows a specific structure of the detected value table. As shown in FIG. 11, the calculated values sequentially calculated by the position calculation section 61 are each associated with the corresponding position number and are stored in the table. The calculated values each have a value corresponding to the distance between the initial position of the optical pickup section 40 and the current position of the optical pickup section 40. The position numbers function as identification values each indicating the target position.

The approximate expression calculation section 85 calculates the approximate expression to approximate the variations of the calculated values of the detected value table stored in the cache 63a. The approximate expression calculated by the approximate expression calculation section 85 is similar to that of the first exemplary embodiment (except for coefficients of the approximate expression). Accordingly, a redundant explanation thereof is omitted. The approximate expression calculation section 85 writes the coefficients of the calculated approximate expression to the coefficient storage section 64.

The coefficient storage section 64 stores the coefficients of the approximate expression calculated by the approximate expression calculation section 85.

The approximate expression execution section 86 reads the coefficients stored in the coefficient storage section 64 to calculate the solution of the expression (1) in response to the control signal sig2 from the controller 80. The difference value X obtained by performing the approximation calculation in this manner (hereinafter, also referred to simply as "approximate value X") is calculated. Note that the approximate expression execution section 86 calculates the approximate value X by sequentially substituting the variations θ of the values each corresponding to the target position into the expression (1). The approximate value X is calculated in this manner. Note that the calculated value X approximated by the approximate expression calculated by the approximate expression execution section 86 is associated with the target position and calculated.

The difference calculation section 62 compares the value input to the first input "a" with the value input to the second input "b", and calculates the difference between the values. The first input "a" of the difference calculation section 62 receives the approximate value X calculated by the approximate expression execution section 86. The second input "b" of the difference calculation section 62 receives the value set by the controller 80. The second input "b" of the difference calculation section 62 receives the signal indicative of the value corresponding to the target position of the optical pickup section 40.

The difference calculation section 62 calculates the difference between two input signal values and outputs the calculated difference. The difference calculation performed by the difference calculation section 62 makes it possible to detect how much the current position of the optical pickup section 40 is deviated from the target position. Each difference value (detected value) calculated by the difference calculation section 62 corresponds to the amount of deviation between the current position and the target position of the optical pickup section 40.

The correction signal generation section 65 generates a correction signal according to the difference value calculated by the difference calculation section 62.

Referring to FIG. 10, the learning operation carried out by the drawing apparatus 200 is described. Note that the optical disk OPD is disposed in the manner as shown in FIG. 7A.

First, the controller 80 drives the spindle motor 10 (S50).

Next, the optical pickup section 40 is set to the initial position (S51). Specifically, in response to the control signal sig1 from the controller 80, the drive waveform generation section 50 generates a drive waveform and outputs to the generated drive waveform to the motor driver 51. The motor driver 51 drives the stepping motor 20 according to the received drive waveform. The drive force generated by the stepping motor 20 in this manner is transmitted to the optical pickup section 40 through the power transmission system. Further, the optical pickup section 40 is disposed at the initial position. Note that, in this case, a focus servo signal and a track servo signal are applied so as to acquire address data from the data surface of the optical disk OPD.

Then, the optical pickup section 40 is moved toward the target position (S52). Specifically, in response to the control signal sig1 from the controller 80, the drive waveform generation section 50 generates a drive waveform and outputs the generated drive waveform to the motor driver 51. The motor driver 51 drives the stepping motor 20 according to the received drive waveform. The drive force generated by the stepping motor 20 in this manner is transmitted to the optical pickup section 40 through the power transmission system. Then, the optical pickup section 40 is moved toward the target position by the predetermined interval.

Then, a step of acquiring address data, a step of calculating a movement distance, and a step of writing data to the cache are sequentially executed in the stated order (S53).

The drawing apparatus 200 executes the step of acquiring address data in the following manner (S53a). In response to the control signal sig5 from the controller 80, the laser driver 70 drives the light emitting section 76. The light emitting section 76 applies a laser beam onto the data surface of the optical disk OPD in accordance with the control by the laser driver 70. The reflected light from the data surface of the optical disk OPD is received by the light receiving section 75. The output signal from the light receiving section 75 is converted to address data by the address decoder 60. In this manner, the address data representing the current position of the optical pickup section 40 is acquired.

The drawing apparatus 200 performs calculation of a movement distance (S53b). Specifically, the position calculation section 61 calculates the movement distance of the optical pickup section 40 based on the address data output from the address decoder 60. The term "movement distance" refers to a movement distance of the optical pickup section 40 from the initial position of the optical pickup section 40. The movement distance is calculated by subtracting a value indicating the initial position of the optical pickup section 40 from a value indicating the current position of the optical pickup section 40.

The drawing apparatus 200 writes the calculated values obtained as described above to the cache (S53d). Specifically, the approximate expression calculation section 85 writes data (calculated values) to the detected value table stored in the cache 63a.

Then, the drawing apparatus 200 determines whether the optical pickup section 40 has reached the outer peripheral position (S54). In this case, the number of target positions is given. Accordingly, the drawing apparatus 200 determines whether the number of step movements of the optical pickup section 40 has reached the predetermined number, thereby determining whether the optical pickup section 40 has reached the final target position.

In the case where the optical pickup section 40 has not reached the final target position, the process returns to the above-mentioned step S52. By repeating the process, the cache 63a of the approximate expression calculation section 85 holds a plurality of calculated values corresponding to the number of movements (number of target positions) of the optical pickup section 40.

In the case where the optical pickup section 40 has reached the final target position, the approximate expression calculation section 85 of the drawing apparatus 200 calculates an approximate expression that approximates variations of the calculated values arranged in the order of the position numbers, based on the detected value table stored in the cache 63a (S70).

Then, the approximate expression calculation section 85 of the drawing apparatus 200 writes the coefficients of the calculated approximate expression to the coefficient storage section 64 (S55). Thus, the drawing apparatus 200 completes the learning operation.

After completion of the learning operation, the coefficients of the approximate expression are stored in the coefficient storage section 64. It is not necessary to store the detected value table itself in the non-volatile memory. Accordingly, the compression of memory resources due to an increase in the amount of data for use in control of the step movement of the optical pickup section 40 can be effectively suppressed.

Referring to FIG. 12, the drawing operation carried out by the drawing apparatus 200 is described.

First, the drawing apparatus 200 moves the optical pickup section 40 toward the predetermined target position (S60). Specifically, in response to the control signal sig1 from the controller 80, the drive waveform generation section 50 generates a drive waveform, and outputs the generated drive waveform to the motor driver 51. The motor driver 51 drives the stepping motor 20 according to the received drive waveform. The drive force generated by the stepping motor 20 in this manner is transmitted to the optical pickup section 40 through the power transmission system. After that, the optical pickup section 40 is moved toward the predetermined target position by the predetermined interval.

Then, the drawing apparatus 200 generates a correction signal (S61). Specifically, in response to the control signal sig2 from the controller 80, the approximate expression execution section 86 reads the coefficients "a" to "l" stored in the coefficient storage section 64, and calculates the solution of the approximate expression by substituting the variation θ of the value corresponding to the target position into the approximate expression. In this manner, the approximate value X corresponding to the current target position is calculated. The approximate value X to be calculated by the approximate expression execution section 86 is associated with the target position and calculated.

Then, the drawing apparatus 200 calculates a difference value. Specifically, the difference calculation section 62 calculates the difference value between the approximate value X calculated by the approximate expression execution section 86 and the predetermined value. The predetermined value input to the second input "b" of the difference calculation section 62 has a value corresponding to the distance between the initial position of the optical pickup section 40 and the current target position of the optical pickup section 40. By performing subtraction between the value calculated by the approximate expression execution section 86 and the predetermined value, the amount of positional deviation between the current position of the optical pickup section 40 and the target position can be calculated. Lastly, the correction signal generation section 65 generates a correction signal having a value corresponding to the difference value calculated by the difference calculation section 62.

Then, the drawing apparatus 200 carries out correction of the drive signal (S62). Specifically, the adder 67 adds the drive signal from the drive signal source 66 and the correction signal generated by the correction signal generation section 65. In this manner, the drive signal output from the drive signal source 66 is corrected by the correction signal generated by the correction signal generation section 65, and the corrected drive signal is input to the actuator driver 68.

When the output of the adder 67 is connected to the actuator driver 68, the lens is disposed in accordance with the output. Specifically, the actuator driver 68 controls the magnetic force applying section 72 in response to the received drive signal to move the lens 73. When the position of the lens 73 is displaced according to the corrected drive signal, the effect of the arrangement deviation of the optical pickup section 40 can be effectively eliminated.

Then, the drawing apparatus 200 carries out the drawing operation (S63). Specifically, the controller 80 outputs the control signal sig4 to the drawing data holding section 69. In response to the control signal sig4, the drawing data holding section 69 outputs the drawing data held therein to the laser driver 70. After that, the laser driver 70 controls the light emitting section 76 based on the received drawing data. Thus, the desired image is formed on each track of the drawing surface of the optical disk OPD.

Then, the drawing apparatus 200 determines whether the optical pickup section 40 has reached the outer peripheral position (S64). Specifically, the controller 80 determines whether the number of step movements of the optical pickup section 40 has reached the predetermined number, thereby determining whether the optical pickup section 40 has reached the final target position.

In the case where the optical pickup section 40 has not reached the final target position, the process returns to the above-mentioned step S60. Specifically, the optical pickup section 40 is moved toward the next target position (S60). By repeating the process, the desired image is formed on the drawing surface of the optical disk.

In the case where the optical pickup section 40 has reached the final target position, the drawing apparatus 200 completes the drawing operation.

As apparent from the above description, also in this exemplary embodiment, it is not necessary to store the detected value table itself in the non-volatile memory as in the first exemplary embodiment. Accordingly, the compression of memory resources due to an increase in the amount of data for use in control of the step movement of the optical pickup section 40 can be effectively suppressed.

Further, also in this exemplary embodiment, the arrangement position of the optical pickup section 40 due to the stepping motor 20 is detected in advance during the leaning operation carried out by the drawing apparatus 200 as in the first exemplary embodiment. The drawing apparatus 200 displaces the lens 73, which is provided in the optical pickup section 40, during the drawing operation according to the error value obtained by comparing the value corresponding to the arrangement position of the optical pickup section 40, which is detected during the learning operation, with the value corresponding to the current target position. In accordance with the displacement of the lens 73, the spot position of the laser beam radiated on the drawing surface is changed. As a result, the effect of the arrangement deviation of the optical pickup section 40 due to the stepping motor 20 can be eliminated. That is, even when the drawing surface of the optical disk has no mark indicating positional information, degradation in quality of the image to be finally drawn can be suppressed independently of the feed accuracy of the feed mechanism itself of the optical pickup section.

The technical scope of the present invention is not limited to the above exemplary embodiments. Any types of drawing targets (optical disks) can be arbitrarily used. The displacement direction of the lens can be arbitrarily determined. Optical components other than the lens may be displaced. The connection relationship among functional blocks can be arbitrarily modified. The drawing apparatus may be realized by partially incorporating a program control. Specifically, the drawing apparatus may be realized by using only hardware or may be realized by controlling hardware using software. The drive signal generating apparatus may be realized using a semiconductor integrated circuit or may be realized by controlling hardware using software (sequentially executing programs by a CPU core in a computer).

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A drive signal generating apparatus comprising:
    an arithmetic section that calculates an approximate expression that approximates variations of a plurality of detected values each representing one of a position of an optical pickup section and an amount of positional deviation of the optical pickup section with respect to a current target position, the position of the optical pickup section being sequentially detected when the optical pickup section moves stepwise toward a plurality of target positions set in advance on a drawing surface of a drawing target; and a drive signal generation section that generates a second drive signal synchronized with a first drive signal for causing the optical pickup section to move stepwise, the second drive signal having a signal value corresponding to an approximate value calculated by substituting a value associated with each of the plurality of target positions into the approximate expression, so as to move an optical component provided in the optical pickup section.

2. The drive signal generating apparatus according to claim 1, wherein the arithmetic section includes a data holding area to temporarily hold the plurality of detected values in chronological order.

3. The drive signal generating apparatus according to claim 2, further comprising a coefficient storage section that stores a coefficient included in the approximate expression calculated by the arithmetic section.

4. The drive signal generating apparatus according to claim 1, wherein the arithmetic section comprises:
   a decoding section that decodes an output signal from a light receiving section provided in the optical pickup section, into an address signal;
   a position calculation section that calculates a value indicating a current position of the optical pickup section according to the address signal output from the decoding section;
   a difference calculation section that obtains the plurality of detected values by calculating a difference value between the value calculated by the position calculation section and a value set in advance depending on the current target position; and
   an approximate expression calculation section that calculates an approximate expression to approximate time-series variations of the plurality of detected values calculated by the difference calculation section.

5. The drive signal generating apparatus according to claim 4, wherein the drive signal generation section adds a correction signal having a signal value corresponding to the approximate value, to a drive signal for displacing the optical component.

6. The drive signal generating apparatus according to claim 5, wherein the drive signal generation section comprises:
   an approximate expression execution section that calculates the approximate value indicating an amount of arrangement deviation of the optical pickup section with respect to the current target position, by substituting a value associated with the current target position into the approximate expression; and
   a correction signal generation section that generates the correction signal having the signal value corresponding to the approximate value calculated by the approximate expression execution section.

7. The drive signal generating apparatus according to claim 1, wherein the arithmetic section comprises:
   a decoding section that decodes an output signal from a light receiving section provided in the optical pickup section, into an address signal;
   a position calculation section that calculates the plurality of detected values each representing a current position of the optical pickup section based on the address signal output from the decoding section; and
   an approximate expression calculation section that calculates an approximate expression to approximate time-series variations of the plurality of detection values calculated by the position calculation section.

8. The drive signal generating apparatus according to claim 7, wherein the drive signal generation section adds a correction signal having a signal value corresponding to the approximate value, to a drive signal for displacing the optical component.

9. The drive signal generating apparatus according to claim 8, wherein the drive signal generation section comprises:
   an approximate expression execution section that calculates the approximate value by substituting a value associated with the current target position into the approximate expression;
   a difference calculation section that calculates a difference value between the approximate value calculated by the approximate expression execution section and a value set in advance depending on the current target position; and
   a correction signal generation section that generates the correction signal having a signal value corresponding to the difference value calculated by the difference calculation section.

10. The drive signal generating apparatus according to claim 1, wherein the drawing target comprises an optical disk with the drawing surface formed on one side thereof, and a data surface having a spiral track formed on another side thereof.

11. A drawing apparatus comprising the drive signal generating apparatus according to claim 1.

* * * * *